United States Patent [19]

Hopfner et al.

[11] 3,838,833

[45] Oct. 1, 1974

[54] THREADING DEVICE

[75] Inventors: Clemens Hopfner, Ruit A. F.; Wolfgang Ort, Stuttgard-Bad Cannstatt, both of Germany

[73] Assignee: Eastman Kodak Company, Rochester, N.Y.

[22] Filed: May 8, 1972

[21] Appl. No.: 250,940

[30] Foreign Application Priority Data
July 1, 1971  Germany........................... 2132770

[52] U.S. Cl.................. 242/195, 242/197, 242/205, 352/72
[51] Int. Cl. .......................................... G03b 23/04
[58] Field of Search ........... 242/195, 197, 192, 210, 242/205, 71.1; 352/72 R, 78 R, 157, 158

[56] References Cited
UNITED STATES PATENTS

| 3,603,529 | 9/1971 | Bundschuh ........................ 242/197 |
| 3,656,703 | 4/1972 | Vockenhuber et al. ............. 242/197 |
| 3,724,777 | 4/1973 | Martin et al. ...................... 242/195 |
| 3,744,889 | 2/1972 | Wilsch et al. ...................... 242/197 |

*Primary Examiner*—George F. Mautz
*Attorney, Agent, or Firm*—Mr. J. Morrow

[57] ABSTRACT

A threading device is provided for use with a motion picture projector of the type adapted to receive a roll of film upon a rotatable spindle which may be inside a cartridge. The threading device includes a support member that is adapted to be moved into contact with a received cartridge to align and firmly hold the cartridge in position. The threading device further includes a member having a hook portion that is adapted to be moved through an opening in the wall of the cartridge and into close proximity with the roll where it engages an opening in the leading end portion of the rotating roll of film. After the film is engaged by the hook member, the hook extracts the leading end of the film from the cartridge and delivers it to transport means of the projector. The hook is then disengaged from the film and moved to a retracted position to avoid interfering with the normal operation of the projector.

9 Claims, 3 Drawing Figures

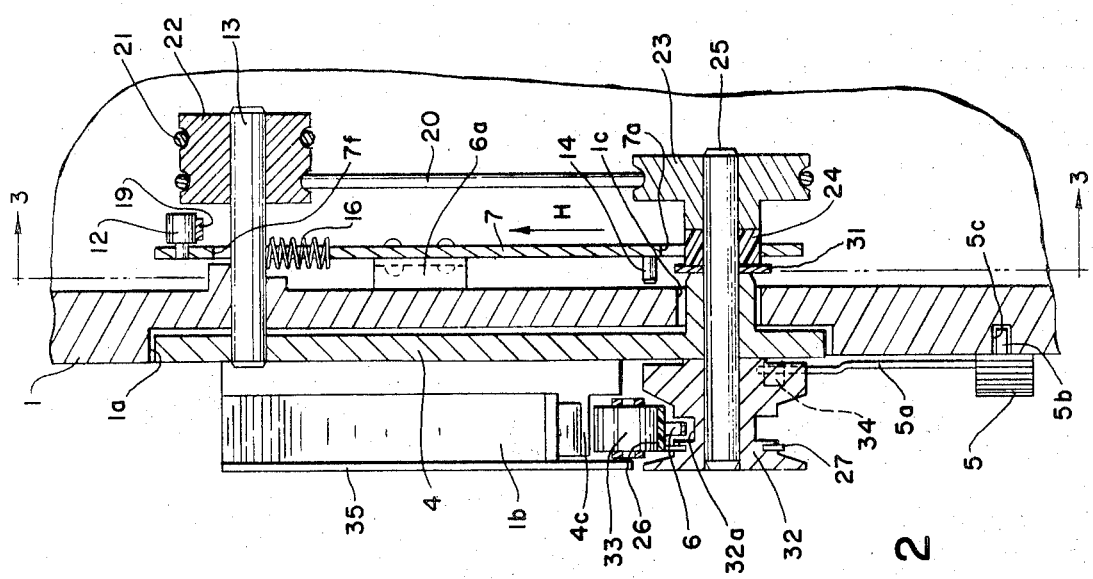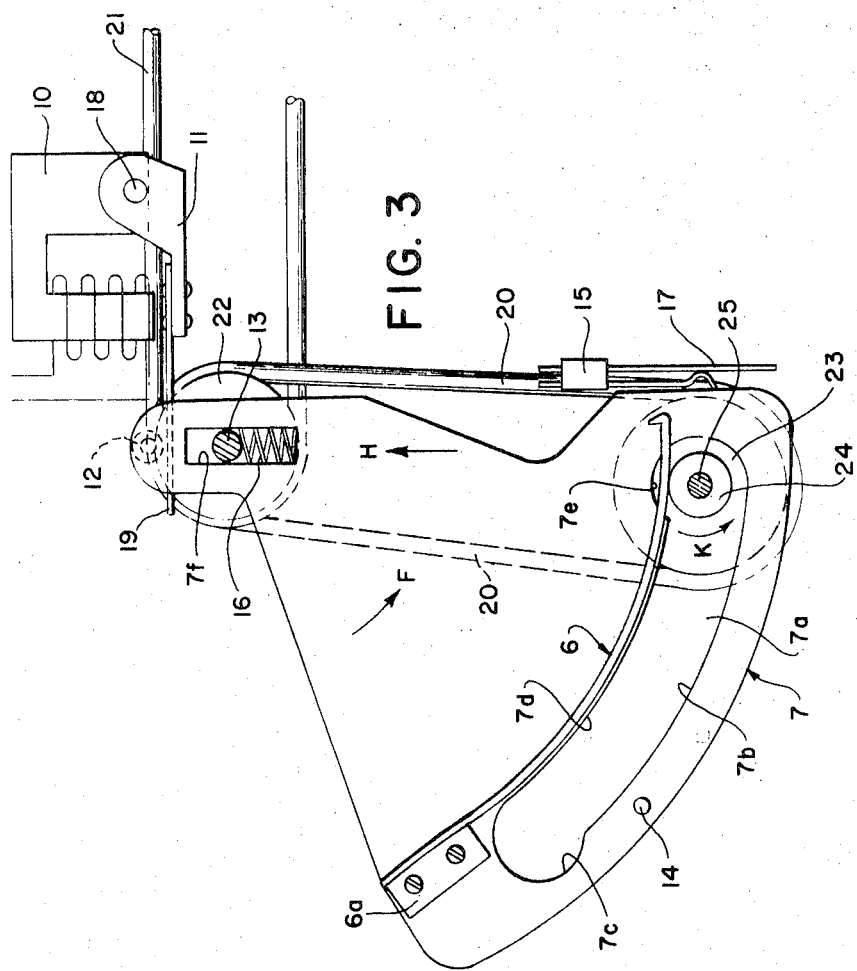

THREADING DEVICE

BACKGROUND OF THE INVENTION

1. Field Of The Invention

The invention relates to a threading device for strip materials, and more particularly to a threading device for a cinematographic projector which has a fixedly located spindle adapted to receive a roll of film in a film cartridge.

2. Description Of The Prior Art

It is known in the motion picture projector art to provide automatic threading devices for use with film cartridges. One such device is disclosed by commonly assigned U.S. Pat. No. 3,429,518 issued Feb. 25, 1969 in the name of E. S. McKee and entitled, "DEVICE FOR STRIPPING AND FEEDING STRIP MATERIAL FROM A ROLL." That patent discloses a film feeding mechanism comprising an endless belt and a stripping finger that are selectively movable into a film cartridge or the like for engaging a film roll within the cartridge. The belt drives the film roll in an unwinding direction and the finger separates the leading end of the film from the roll. The film then is guided by the belt and the finger into a film gate and the film feeding mechanism is retracted from the cartridge. Modifications to such a film feeding mechanism has been described in commonly assigned U.S. Pat. application Ser. No. 76,080 filed Sept. 28, 1970 in the name of J. J. Bundschuh entitled, "FILM FEEDING MECHANISM WITH MOVABLE CARTRIDGE MOUNTING MEANS" now U.S. Pat. No. 3,672,601, which discloses a mechanism providing for a movable spindle for allowing the aforementioned mechanism to be used in film cartridges containing various sizes of film rolls. While the apparatus disclosed in the aforementioned patent and patent application have proven successful, they tend to be somewhat complex mechanically due to the need to coordinate operation of the drive belt and the stripping finger.

Commonly assigned U.S. Pat. No. 3,628,751 issued Dec. 21, 1971 in the names of G. Brauning and W. Ort and entitled, "AUTOMATIC FILM-THREADING DEVICE," discloses film feeding by use of a driven sprocket that is engageable with an opening in the film strip (such as the usually sprocket holes or perforations normally provided in motion picture film) for driving film from the supply to the self-threading apparatus of the projector. In operation, the openings in the film strip are brought into engagement with the sprocket by rotating the film supply roll in a take-up direction, thereby causing the free, leading end portion of the film roll to be swung in a circular path so that it can contact the sprocket which is positioned in such path and aligned with the opening in the film.

German Offenlegungsschrift 1,812,211 (corresponding to U.S. Pat. No. 3,604,657) discloses a withdrawal device of a type more suitable for use with a film magazine. The device is provided with a hook portion which is engageable with a perforation in the film and when the film is driven in the take-up direction and the hook is moved manually towards the film roll. After the perforation has been engaged by the hook, the film can then be transmitted to the transport means of the projector and the device then released to its remote position. The operation of this device is manual and it is not readily adapted to various sizes of film magazines.

Another type of film feeding device which is also suitable for a film cartridge (as well as unenclosed film reels) is disclosed in commonly assigned copending U.S. Pat. application Ser. No. 77,959 entitled "AUTOMATIC FILM STRIPPING SYSTEM," filed Oct. 5, 1970 in the names of W. A. Martin and J. Q. St. Clair II, now U.S. Pat. No. 3,724,777, and U.S. Pat. application Ser. No. 113,922 entitled, "FILM FEEDING APPARATUS," filed Feb. 9, 1971 in the name of E. S. McKee, now U.S. Pat. No. 3,724,796. The film feeding mechanisms disclosed therein comprise a finger member having a hook on a free end portion thereof with the finger being movable to position the hook in close proximity to or engagement with the outer convolution of any of various sizes of film rolls that are rotatable about a spindle. To facilitate engagement of the film by the hook, the free end portion of the film has an elongated opening therein and the film is driven in a take-up direction with the hook extended to a position adjacent to the opening in the film. After engagement with the film, the hook is moved to draw the leading end of the film away from the roll and furnish it to the threading mechanism of a motion picture projector. While such a device is suitable for use with film cartridges, ordinarily the threading device is used with a movable spindle so that it can feed film from a full range of cartridge sizes (e.g., cartridges having capacities of 50–400 feet of film.) Such a spindle is more complex and thus more expensive to manufacture. The present invention is an improvement over this type of film threading mechanism in that the invention removes the necessity for having a movable spindle. More specifically, the present invention permits the spindle be fixedly positioned on the projector and allows for a movable supporting base which carries with it a film feeding mechanism of the type disclosed, thus simplifying the projector structure without limiting its use with various sizes of film cartridges.

SUMMARY OF THE INVENTION

It is an object of this invention to provide an automatic threading mechanism which is suitable for use with various sizes of film rolls without adjusting the position of the supply spindle.

Another object of the invention is to provide an improved mechanism for feeding film from the supply roll of film cartridges and, more specifically, to provide such a film feeding mechanism which is inexpensive and yet highly reliable for effecting automatic threading of the film from various sizes of film cartridges.

In accordance with the present invention, apparatus of the type having a rotatable spindle which is fixedly located is provided with a support base which is movable to align and firmly hold cartridges which have been positioned on the apparatus with a wall of web material in the cartridge rotatably attached to the spindle. The support base carries a feeding mechanism which includes a member having a hooked portion that is adapted to enter through an opening in a wall of the cartridge so that the hook can engage an opening in the material which is rotated inside the cartridge by the spindle. The member is mounted for movement between a first position wherein the hook portion is in spaced relation with the opening in the material in the cartridge to a second position wherein the hook portion is engageable with the opening in the material when the roll is rotated in the take-up direction. Once the hook has engaged the strip, the member is retracted from the cartridge so as to extract the end of the material and direct the end to the transport means provided in the projector. The threading device then is retracted automatically to a third position wherein it is out of contact with the film and does not interfere with the normal operation of the projector.

The invention, and its objects and advantages will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which:

FIG. 2 is a section taken along line 2—2 of FIG. 1 showing the device in operating position; and FIG. 3 is a section taken along line 3—3 in FIG. 2.

DESCRIPTION OF THE PREFERRED EMBODIMENT

Figure 1:
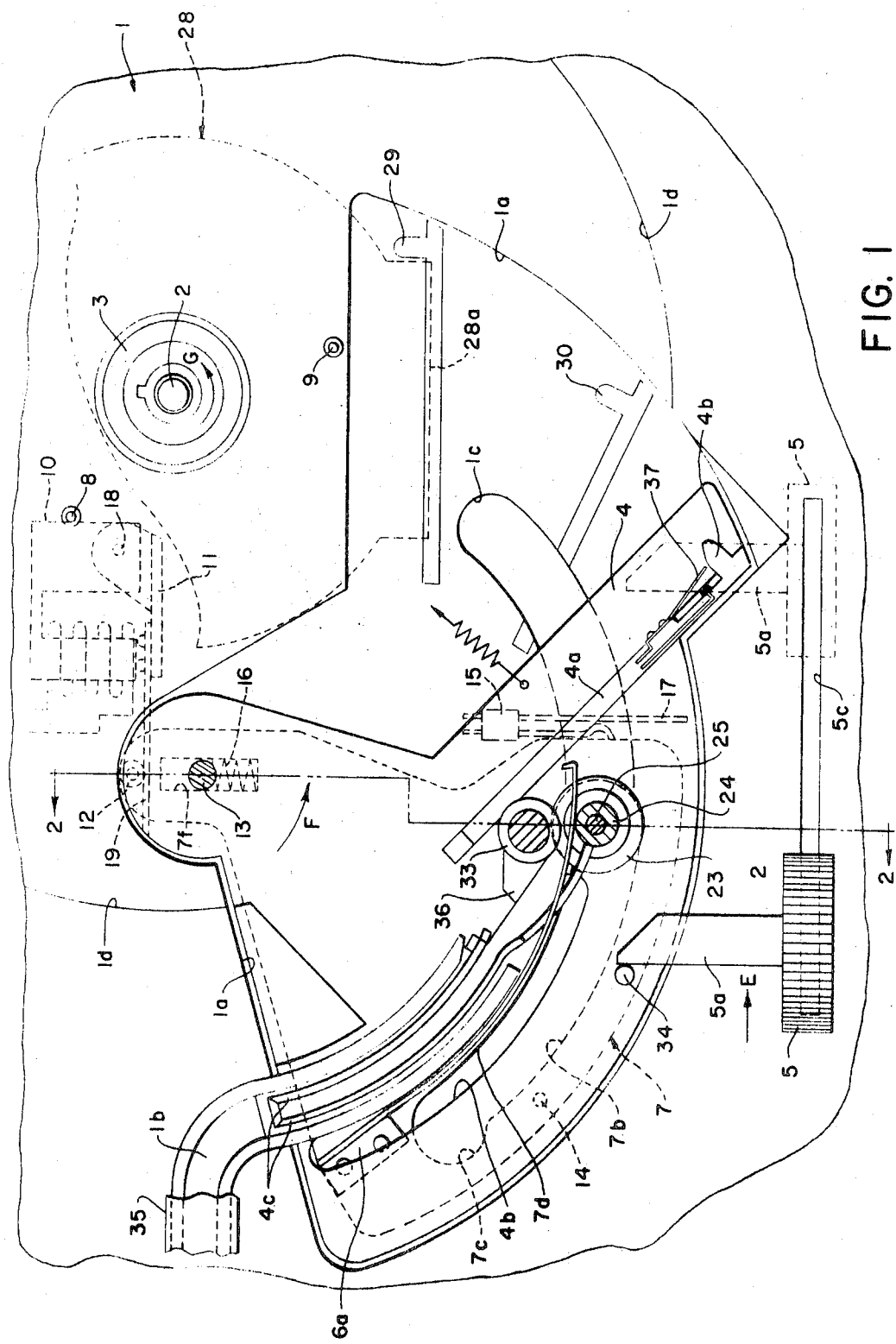
FIG. 1 is a plan view, partially broken away, of a preferred embodiment of a threading device according to the invention, showing it in operating position in conjunction with a known type of film transport means for a motion picture projector.

Because motion picture projectors and related apparatus are well known, the following description is directed in particular to those elements forming part of, or cooperating directly with the present invention, elements that are not specifically shown or described herein being understood to be selectable from those known in the art.

Referring now to the drawings in detail, FIGS. 1–3 illustrate a preferred embodiment of the present invention for use in a motion picture projector. As shown by FIG. 1, a spindle 2 is rotatably mounted on a housing 1 and is driven about an axis in a counter-clockwise direction (as indicated by the arrow "G") in a known manner (not illustrated) by means of a friction coupling. FIGS. 2 and 3 show a driving belt 21 which transmits the motion of the spindle 2 to a pulley 22 mounted for rotation about a shaft 13. Through a driving belt 20, pulley 22 drives a second pulley 23 which, together with a shaft 25, is mounted for rotation in a supporting member 4.

Shaft 13 is secured in the housing 1 and is used for mounting a support member 4 in a pivotal manner. Support member 4 is located in a recess 1a of the housing 1. Also, as shown in FIGS. 2 and 3, by means of a slot 7f, a control plate 7 is pivotally and slidably mounted about the shaft 13 between the pulleys 22, 23 and the housing 1, and control plate 7 is influenced in that position by springs 16 and 19.

FIG. 3 shows a drive roller 24 located in a curved opening 7a of the control plate 7 and secured on shaft 25. Drive roller 24 preferably consists of a material having a high co-efficient of friction. As seen in FIG. 2, a disk 31, which is positioned around shaft 25 between the drive roller 24 and the adjacent mounting portions of the support member 4, improves the sliding properties of these two components. As explained more fully later, roller 24 can engage the edges of slot 7a to drive the control plate 7. The ends of the opening 7a are enlarged to form open portions 7c and 7e, in each of which the drive roller 24 is inoperative.

A withdrawal hook 6 is secured to the control plate 7 by means of a bent-off or flange portion 6a of the hook and the withdrawal hook 6 projects outside through an opening 1c in the housing 1 and opening 4b in the support member 4.

As shown in FIG. 2, a transport roller 32, which carries out the transport of the film up to the film gate (as described in more detail later), is mounted on the shaft 25. The transport roller 32 is provided with a groove 32a in which the withdrawal hook 6 is movable. A ring 27 (preferably consisting of rubber or a rubber-like material) has been inserted into transport roller 32 in order to improve its transport properties.

As best seen in FIG. 1, a film guide 4c which is located on the support member 4 cooperates in a telescopic manner with a film guide 1b secured to the housing 1. As shown in FIG. 2, the film guides 1b and 4c are covered by covers 35. A resilient mounting element 36 is secured to the film guide 4c and is adapted for mounting a pressure roller 33 which resiliently urges the film 26 against the transport roller 32.

As shown in FIG. 2, an opening 1c is provided in the housing 1 through which shaft 25 passes to connect the outer portions of the device with the inner portions of the device while allowing the pivotal movement of the support member 4. The follower connection between the support member 4 and the control plate 7 is achieved by means of the shaft 25 mounted in the support member 4 and by means of the drive roller 24 mounted on the shaft 25.

FIG. 1 shows the support member 4 which is connected to a bar 4a and is adapted for cooperating with a cartridge 28 (shown in phantom). A lug 4b arranged on the bar 4a serves to accurately adjust and position the cartridges. Bar 4a carries a switch 37 which is adapted for cooperating with the cartridge 28.

To aid in operation of the threading device, colored marks 29 and 30 are provided on the housing 1 to provisionally align smaller cartridges (e.g., cartridges with 50–220 feet of film) in their proper positions. Bar 4a together with the outline 1d of the housing serve to provisionally align larger cartridges (e.g., cartridges for approximately 400 feet of film).

Although the operation and control of this device will be explained later in greater detail, some of the control features will be pointed out at this time. Upon inspection of FIG. 1, it may be seen that support member 4 is urged by a spring (shown diagrammatically) to bear with its pin 34 against an arm 5a of a button 5. A pin 5b on the lower side of the button slides in a slot 5c in housing 1 to guide the button along the housing. As shown in the upper portion of FIG. 3, control plate 7 is provided with a pin 12 which is engaged by a leaf spring 19. The leaf spring 19 is secured to the armature 11 of an electromagnet 10 which is pivoted about pivot 18 on the housing 1. Referring to FIGS. 1 and 2, a pin 14 is secured to the control plate 7 for cooperating with a switch 15, 17 mounted on the support member 4.

Shown in FIG. 1 are centering pins 8 and 9 as well as a centering flange 3 which are provided on the housing 1. These centering means 3, 8, 9 cooperate with protrusions and/or indentations on the cartridge (see for instance, a cartridge according to German Offenlegungsschrift 1,926,195 corresponding to U.S. Pat. No. 3,547,373), and together with the bar 4a of the support member 4 cause the cartridge reel to be centered relative to the cartridge housing such that the cartridge reel can freely rotate in the cartridge housing.

To best understand the operation of the device, the operation will be described in a step-by-step approach while referring primarily to FIG. 1.

First, a cartridge 28 is placed on the spindle 2 with the portion 28a of the cartridge arranged to approximately register with either of the color marks 29, 30 or with means 4a and 1d respectively, depending upon the size of the cartridge. Portion 28a of the cartridge has an opening through which hook member 6 can pass.

Next the button 5 is moved to the right (as shown by the direction of the arrow E in FIG. 1). This movement is followed by the support member 4 and the control plate 7 which carry out a pivotal movement in a counter clockwise manner about shaft 13 (the direction shown by the arrow F). This pivotal movement is continued until the bar 4a of the support member 4 makes contact with the cartridge portion 28a and together with the lug 4b of the support member accurately aligns, adjusts and holds the body of the cartridge 28 and the opening in the cartridge portions 28a in a desired location. Bar 4a will then be either at the position shown in FIG. 1 or substantially in alignment with marks 29 and 30. Switch 37 which renders the withdrawal device ready for operation is closed at this time by engagement with the cartridge 28. Switch 37 ensures that the withdrawal operation is only initiated when the cartridge and the withdrawal device are properly positioned.

When the button 5 is in a final position (such as a position indicated by broken lines in FIG. 1), the projector drive is actuated for driving the reel of cartridge 28 via the spindle 2. When the spindle 2 is driven, the drive roller 24 and the transport roller 32 also are driven by means of the drive belts 21 and 20.

As will be understood from FIG. 3, when switch 37 is closed and the projector has been actuated, the electromagnet 10 is energized so as to attract the armature 11. Via pin 12, the leaf spring 19 of the armature 11 lifts the control plate 7 in a vertical direction against the bias of spring 16 (in the direction of the arrow H). Now the drive roller 24 rotates in a counterclockwise direction (as shown by the arrow K) and is held in contact with the outer control curve 7b of the control plate 7 under the influence of leaf spring 19. This causes the control plate 7, together with the withdrawal hook 6, to be moved counterclockwise (also in the direction of the arrow F). The withdrawal hook 6 is in this way moved into the opening in cartridge portion 28a. The movement of the control plate 7 and the withdrawal hook 6 is interrupted when the drive roller 24 reaches the enlarged portion 7c of the control plate 7 where the drive roller 24 continues to rotate without being able to exert an influence on the control plate 7.

The rotating film roll or its film end in the cartridge respectively makes contact with the withdrawal hook 6 which has been introduced into the cartridge. A perforation of the film 26, preferably a specially formed perforation arranged at a predetermined distance from the film end, is brought into engagement with the withdrawal hook 6. Since the film roll in the cartridge 28 rotates in the counterclockwise direction, withdrawal hook 6 and the control plate 7 are also pulled along in this direction by the film. As may be seen from FIG. 3, pin 14 which is mounted on the control plate 7 makes contact with switch member 17 and opens the normally-closed switch 15 so that a control circuit (not shown) for the electromagnet 10 is disconnected.

When the control circuit of electromagnet 10 is broken, armature means 11 of the electromagnet is de-energized and spring 19 no longer urges plate 7 upwardly. Spring 11 then urges the control plate 7 downwardly (counter to the direction of the arrow H). The drive roller 24 (which continues to rotate) is thus caused to make contact with the inner control curve 7d of the control plate 7, so that the control plate 7 and the withdrawal hook 6 are now moved in a clockwise direction (opposed to the direction of the arrow F). The film end engaged by the hook 6 is thus withdrawn from the cartridge 28, moved into the area between the transport roller 32 and the pressure roller 33 so that it is engaged between these rollers.

This movement of the withdrawal hook 6 and the control plate 7 respectively (in a direction contrary to the direction of the arrow F) is terminated when the drive roller 24 has reached the enlarged opening 7e of the control plate 7 where the drive roller 24 is once again without any influence on the control plate 7.

When the film 26 has been brought into engagement with the transport roller 32, the film is advanced by roller 32 into the film guides 4c, 1b until the leading end of the film has been engaged by transport means (not shown) provided on the projector. As soon as this has been achieved, a certain degree of tension is created in the film causing the resiliently mounted pressure roller 33 to be lifted resulting in film 26 being disengaged from the transport roller 32.

In order to switch off the projector, the button 5 is moved to the left (counter to the direction of the arrow E) so that the projector drive is rendered inoperative by opening switch 37, and the support plate 4 as well as the control plate 7 are again reset into their starting positions.

The arrangement described permits a particularly easy handling of a threading device, for instance in a cinematographic projector of the type described. No additional manual operations are needed to be carried out on the projector in order to adapt the projector to cartridges of different sizes, or to actuate the threading device.

The invention has been described in detail with particular reference to preferred embodiments thereof, but it will be understood that variations and modifications can be effected within the spirit and scope of the invention.

I claim:

1. An improvement in apparatus of the type having (1) a rotatable spindle mounted in a fixed position, with the spindle adapted to receive a roll of web material located in a cartridge and having a perforation at a spaced distance from the end of the web, and (2) a transport means for moving the web along a desired path in the projector, the improvement comprising:
   a. housing means;
   b. support means movably supported by said housing means for aligning and holding a received cartridge;
   c. means for moving said support means between (1) a first position wherein said support means is in spaced relation from a received cartridge, and (2) a second position wherein said support means is engageable with a received cartridge;

d. withdrawal means for (1) engaging the web material contained in a received cartridge through the perforation in the material, and (2) withdrawing and directing the web away from the cartridge toward the transport means of the apparatus; and
e. means for moving said withdrawal means (1) from a first position wherein said withdrawal means is in spaced relation from a received cartridge to a second position wherein said withdrawal means engages the web material, and (2) from said second position after said withdrawal means has engaged the web material to a third position herein said withdrawal means extracts the web from the cartridge and directs the web toward the transport means of the projector.

2. The improvement as set forth in claim 1 wherein the improvement further comprises:
  a. guide means for receiving the web material from the withdrawal means and directing it along a path to the transport means of the projector; and
  b. means for driving said web material along said guide means.

3. The improvement as set forth in claim 2 wherein said guide means comprises a first portion attached to the projector and the second portion attached to said support means, said first and second portions fit together in a telescopic manner such that said guide means can be extended in length as said support moves toward said second position.

4. The improvement as set forth in claim 1 wherein said withdrawal means comprises an elongated member having a hook portion, the hook portion being movable through an opening in the cartridge and into said second position wherein the hook portion is engageable with the perforation in the web material when the roll of web material in the cartridge is rotated in a direction for taking up the web onto the roll.

5. The improvement as set forth in claim 1 wherein said improvement further comprises a normally open first switch means for controlling a function of the apparatus, wherein said switch being positioned to be closed when the support means is in said second position and said support means engages a cartridge.

6. The improvement as set forth in claim 5 wherein said improvement further comprises electromagnetic means coupled to said withdrawal means, said electromagnetic means being controlled by said first switch means and charging a first state wherein said electromagnetic means is not energized and a second state wherein said electromagnetic means is energized, said electromagnetic means when energized causing said withdrawal means to cooperate with said means for moving said withdrawal means to effect movement of the withdrawal means from said first position to said second position.

7. The improvement as set forth in claim 6 wherein the improvement further comprises a normally closed second switch means adapted for controlling said electromagnetic means, said switch being positioned to be opened when said withdrawal means is in said second position, such that said electromagnetic means is de-energized causing said withdrawal means to cooperate with said means for moving said withdrawal means, resulting in movement of the withdrawal means from said second position to said third position.

8. The improvement as set forth in claim 1 wherein said support means further comprises a bar having a positioning lug for aligning a received cartridge upon contact with said cartridge.

9. The improvement as set forth in claim 1 further comprising aligning marks on the housing for provisionally aligning cartridges of different sizes on the housing.

* * * * *